(12) United States Patent
Breton et al.

(10) Patent No.: US 7,172,276 B2
(45) Date of Patent: *Feb. 6, 2007

(54) HETEROGENEOUS LOW ENERGY GEL INK COMPOSITION

(75) Inventors: Marcel P. Breton, Mississauga (CA); Christy E. Bedford, Burlington (CA); Guerino G. Sacripante, Oakville (CA)

(73) Assignee: Xerox Corporation, Stamford, CT (US)

( * ) Notice: Subject to any disclaimer, the term of this patent is extended or adjusted under 35 U.S.C. 154(b) by 234 days.

This patent is subject to a terminal disclaimer.

(21) Appl. No.: 11/008,627

(22) Filed: Dec. 10, 2004

(65) Prior Publication Data

US 2006/0128829 A1   Jun. 15, 2006

(51) Int. Cl.
*G01D 11/00* (2006.01)

(52) U.S. Cl. .................. 347/100; 347/95; 523/160

(58) Field of Classification Search ........... 347/100, 347/95, 96, 101; 523/160; 106/31.6, 31.27, 106/31.32

See application file for complete search history.

(56) References Cited

U.S. PATENT DOCUMENTS

| | | | |
|---|---|---|---|
| 3,653,932 A | 4/1972 | Berry et al. |
| 4,094,685 A | 6/1978 | Lester et al. |
| 4,390,369 A | 6/1983 | Merritt et al. |
| 4,484,948 A | 11/1984 | Merritt et al. |
| 4,538,156 A | 8/1985 | Durkee et al. |
| 4,684,956 A | 8/1987 | Ball |
| 4,745,420 A | 5/1988 | Gerstenmaier |
| 4,788,123 A | 11/1988 | Berkes et al. |
| 4,851,045 A | 7/1989 | Taniguchi |
| 4,889,560 A | 12/1989 | Jaeger et al. |
| 4,889,761 A | 12/1989 | Titterington et al. |
| 5,006,170 A | 4/1991 | Schwarz et al. |
| 5,099,256 A | 3/1992 | Anderson |
| 5,145,518 A | 9/1992 | Winnik et al. |
| 5,146,087 A | 9/1992 | Van Dusen |
| 5,151,120 A | 9/1992 | You et al. |
| 5,195,430 A | 3/1993 | Rise |
| 5,202,265 A | 4/1993 | La Mora |
| 5,208,630 A | 5/1993 | Goodbrand et al. |
| 5,221,335 A | 6/1993 | Williams et al. |
| 5,225,900 A | 7/1993 | Wright |
| 5,231,135 A | 7/1993 | Machell et al. |
| 5,256,193 A | 10/1993 | Winnik et al. |
| 5,271,764 A | 12/1993 | Winnik et al. |
| 5,275,647 A | 1/1994 | Winnik |
| 5,286,286 A | 2/1994 | Winnik et al. |
| 5,301,044 A | 4/1994 | Wright |
| 5,372,852 A | 12/1994 | Titterington et al. |
| 5,378,574 A | 1/1995 | Winnik et al. |
| 5,385,803 A | 1/1995 | Duff et al. |
| 5,389,958 A | 2/1995 | Bui et al. |
| 5,496,879 A | 3/1996 | Griebel et al. |
| 5,543,177 A | 8/1996 | Morrison et al. |
| 5,554,480 A | 9/1996 | Patel et al. |
| 5,593,807 A | 1/1997 | Sacripante et al. |
| 5,621,022 A | 4/1997 | Jaeger et al. |
| 5,761,597 A | 6/1998 | Smith et al. |
| 5,945,245 A | 8/1999 | Mychajlowskij et al. |
| 5,977,207 A | 11/1999 | Yui et al. |
| 6,221,137 B1 | 4/2001 | King et al. |
| 6,309,452 B1 | 10/2001 | Beach et al. |
| 6,811,596 B1 | 11/2004 | Bedford et al. |
| 2002/0147250 A1 | 10/2002 | Beach et al. |
| 2003/0149133 A1 | 8/2003 | Lau et al. |
| 2004/0065227 A1 | 4/2004 | Breton et al. |
| 2004/0118320 A1 | 6/2004 | Akers et al. |

FOREIGN PATENT DOCUMENTS

| | | |
|---|---|---|
| DE | 42 05 636 A1 | 8/1993 |
| DE | 42 05 713 A1 | 8/1993 |
| EP | 0 187 352 A2 | 7/1986 |
| EP | 0 206 286 | 12/1986 |
| EP | 0 878 516 A2 | 11/1998 |
| JP | A-8-132740 | 5/1996 |
| JP | A-10-81843 | 3/1998 |
| WO | WO 94/04619 | 3/1994 |

*Primary Examiner*—Manish S. Shah
(74) *Attorney, Agent, or Firm*—Oliff & Berridge, PLC

(57) ABSTRACT

An ink composition includes a colorant, a polymer latex such as a terpolymer latex, an optional dissipatable polymer, a dispersant such as a sulfonated polyester, and a liquid vehicle such as water. The ink composition is a stable liquid at ambient temperature, but becomes a gel upon heating or removal of part of the liquid vehicle.

24 Claims, No Drawings

HETEROGENEOUS LOW ENERGY GEL INK COMPOSITION

BACKGROUND

This invention relates generally to ink compositions, and more particularly to heterogeneous low energy gel ink compositions. Even more particularly, the present invention relates to ink compositions that contain a colorant, a latex, a polyol and/or a diol, a dispersant such as a sulfonated polyester, and a liquid vehicle such as water.

In general, phase change inks (sometimes referred to as "hot melt inks" and/or "gel inks") are in the solid phase at ambient temperature, but exist in the liquid phase at the elevated operating temperature of an ink jet printing device, such as a piezoelectric ink jet printing device. At the jet operating temperature, droplets of liquid ink are ejected from the printing device and, when the ink droplets contact the surface of the recording substrate, either directly or via an intermediate heated transfer belt or drum, they quickly solidify or become immobilized to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Gel inks can be considered a particular type of phase change inks. In gel inks, the ink compositions generally exist as stable, often liquid, compositions at low temperature, but form solutions of very high viscosity at high temperatures and/or when water is removed from the ink. The type of phase change that occurs is from the stable liquid to a higher viscosity gel matrix, which still contains liquid components. Thus, the gel inks can be used to print on a heated substrate, or can be used to print on a lower temperature substrate when a heating device is used, such as a radiant heater or a fuser.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,560, 4,889,761, and 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling, as well as for both office and production printing applications including specialty applications.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. Nos. 3,653,932, 4,390,369, 4,484,948, 4,684,956, 4,851,045, 4,889,560, 5,006,170, 5,151,120, 5,372,852, and 5,496,879, European Patent Publications 0187352 and 0206286, German Patent Publications DE 4205636AL and DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

While known compositions and processes are suitable for their intended purposes, a need remains for phase change and other inks that are suitable for ink jet printing processes, such as piezoelectric ink jet printing processes and the like. In addition, a need remains for inks that can be jetted at lower temperatures than currently known phase change inks, thereby enabling reduced energy use and improved thermal stability of the ink. Further, a need remains for inks that exhibit desirably low viscosity values at jetting temperatures, thereby enabling increased jetting frequency. Additionally, a need remains for inks that generate images having a desirably low coefficient of friction, thereby improving performance when substrates having the inks printed thereon are passed through automatic document handlers in copiers and also improving feel of the image and in some cases improving dry smear characteristics. There is also a need for inks that generate images with reduced pile height. In addition, there is a need for inks that generate images with improved scratch resistance. Further, there is a need for inks that generate images with improved look and feel characteristics. Additionally, there is a need for inks that generate images with improved permanence and toughness characteristics. A need also remains for inks that are suitable for high speed printing, thereby enabling transaction and production printing applications.

For example, despite these various ink designs, however, improved ink compositions are still required. In particular, improved ink compositions are required to provide improved print performance, such as permanence and robustness on a variety of print substrates, improved optical density, less showthrough (i.e., appearance from an opposite side of the printed substrate), and the like.

SUMMARY

Various of the above needs, and/or others, are provided by embodiments.

Particularly, various of the above needs, and/or others, are provided by an ink composition, comprising:

a colorant;
a polymer latex;
an optional dissipatable polymer;
a polyester; and
a liquid vehicle.

DETAILED DESCRIPTION OF EMBODIMENTS

Phase change inks of the present invention contain a phase change carrier system or composition. The phase change carrier composition is typically designed for use in either a direct printing mode or an indirect or offset printing transfer system. The phase change carrier composition generally enables the ink composition to change from a stable, liquid composition at low temperature to a higher viscosity gel composition at higher temperatures or when water and/or solvent is removed.

In the direct printing mode, the phase change carrier composition in one embodiment contains one or more materials that enable the phase change ink (1) to be applied in a thin film of uniform thickness on the final recording substrate (such as paper, transparency material, and the like) when cooled to ambient temperature after printing directly to the recording substrate, (2) to be ductile while retaining sufficient flexibility so that the applied image on the substrate will not fracture upon bending, and (3) to possess a high degree of lightfastness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958, the disclosure of which is totally incorporated herein by reference.

The ink compositions of the present invention generally include a colorant, a latex, a polyol and/or a diol, a dispersant such as sulfonated polyester, and a liquid vehicle such as water.

The latex utilized in forming the ink composition is preferable a polymeric latex. In embodiments, it is preferred that the polymer latex be a copolymer or preferably a terpolymer latex. In embodiments where the latex is a terpolymer latex, the terpolymer is preferably comprised of monomer units in a block or preferably random combination of the following formula:

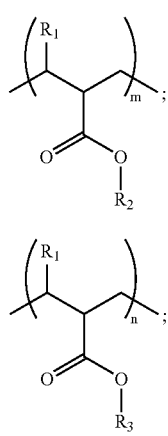

A

B

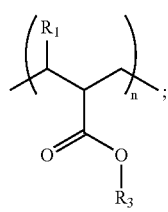

-continued

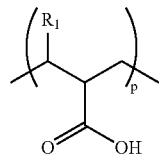

C wherein A, B and C represent monomer units, m, n and p represent mole fractions of the respective monomer unit of the random terpolymer, each $R_1$ is independently a hydrogen or methyl group corresponding to the acrylate or methacrylate monomer, $R_2$ is a substituted or unsubstituted alkyl chain of from 1 to about 10 carbon atoms such as methyl, ethyl, propyl, butyl, or a substituted or unsubstituted phenyl group; and $R_3$ is an alkoxyl group of one or more oxygen atoms, such as ethylene oxide, polyethylene oxide having from 2 to about 10 or to about 20 ethylene oxide units or propylene oxide.

In the above formula for the terpolymer, A, B and C are preferably (meth)acrylate-based monomer species, which can be substituted or unsubstituted. As used herein, (meth) acrylate is used to refer to an acrylate or a methacrylate; thus, methyl (meth)acrylate refers to methyl acrylate or methyl methacrylate. Preferably, A represents a phenyl (meth)acrylate, B represents an alkoxyl (meth)acrylate where the alkoxyl group is —C—C—(O—C—C)$_3$, and C represents an acidic (meth)acrylate such as acrylic acid or methacrylic acid.

In the above formula for the terpolymer, n, m and p represent mole percents of the respective polymer units. Each of n, m and p is independently from about 0.1 to about 99.9 mole percent, which the sum n+m+p totaling 100, and preferably n is from about 30 to 50 mole percent, m is from about 10 to 50 mole percent and p is from about 1 to about 5 mole percent and provided that the sum of m,n and p is 100 mole percent of the terpolymer.

The latex is preferably provided in the form of a suspension or latex of the terpolymer in a suitable liquid, such as water. The latex can be provided, for example, with a solids content ranging from about 10 or 20 percent to about 60 or 70 percent, although about 30 to about 40 percent, or about 36 percent, is preferred.

The ink composition also optionally includes a dissipatable polymer, or humectant, which generally can be used to improve water retention at the printhead nozzle for improved jetting functionality, particularly after the printhead has been left idle for a long period of time. Examples of such dissipatable polymers include, but are not limited to, glycols and glycerine initiated polyether triols. Specific examples include, for example, propoxylated polyols, such as VORANOL® CP 450 polyol (a glycerine propoxylated polyether triol with an average molecular weight of 450) and VORANOL® CP 300 polyol (a glycerine propoxylated polyether triol with an average molecular weight of 300). A preferred dissipatable polymer is embodiments is VORANOL® 370, available from Dow Chemical Co., Midland, Mich. VORANOL® 370 is believed to be a mixture of one or more of the following:

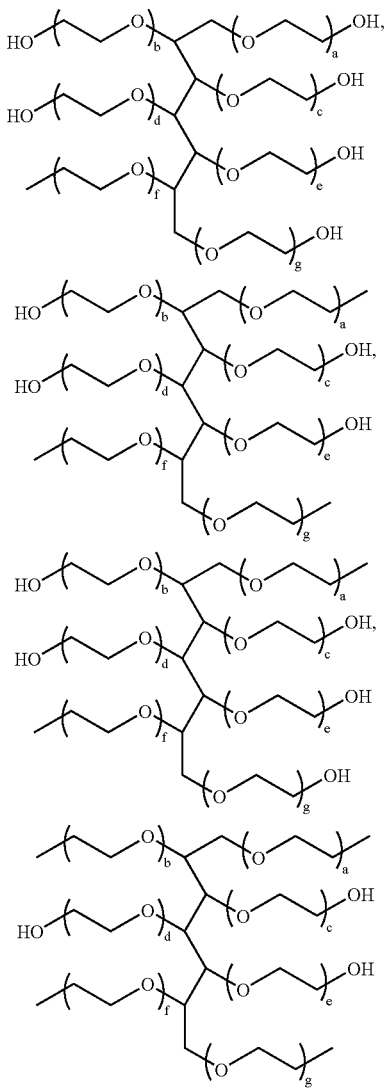

and any other possible mono-, di-, tri-, and tetravalent groups based on this VORANOL® (available from Dow Chemical Co., Midland, Mich.) central group, wherein a, b, c, d, e, f, and g are each integers representing the number of ethylene oxide repeat units and the molecular weight of the starting material (wherein all end groups are terminated by hydroxy groups) is about 1,040.

The ink composition also preferably contains a dispersant and/or surface active additive to assist in dispersing the other ink components in the liquid vehicle. Examples of the dispersant that can be used include, but are not limited to, water soluble polymers, such as polyvinyl alcohol, methyl cellulose, ethyl cellulose, hydroxyethyl cellulose, carboxymethyl cellulose, polysodium acrylate and polysodium methacrylate; an anionic surfactant, such as sodium dodecylbenzenesulfonate, sodium octadecylsulfate, sodium oleate, sodium laurate and potassium stearate; a cationic surfactant, such as laurylamine acetate, stearylamine acetate and lauryltrimethylammonium chloride; an amphoteric surfactant, such as lauryldimethylamine oxide; a nonionic surfactant, such as polyoxyethylene alkyl ether, polyoxyethylene alkylphenyl ether and polyoxyethylene alkylamine; an inorganic salt, such as tricalcium phosphate, aluminum hydroxide, calcium sulfate, calcium carbonate and barium carbonate; mixtures thereof; and the like. In some preferred embodiments, the dispersant is a polyester, preferably a sulfonated polyester.

In embodiments, the polymeric or high molecular weight dispersant selected for the ink composition can be added in amounts either to provide its stabilizing action, or in higher amounts. Thus, for example, the component can be added in higher proportions than required for stabilizing the ink, thereby acting as a viscosity modifier.

When a polyester is used as the dispersant, the polyester dispersant is most preferably a sulfonated polyester. The sulfonated polyester may be formed from any suitable acid and alcohol. Preferably, the polyester is derived from one or more terephthalates and one or more glycols. For example, the polyester may be derived from a reaction that includes, for example, three glycol components. In a most preferred embodiment herein, the polyester is a sulfonated polyester derived from a reaction of dimethylterephthalate, sodium dimethyl 5-sulfoisophthalate, propanediol, diethylene glycol and dipropylene glycol.

Additional examples of sulfonated polyesters which may be used in the present invention include those illustrated in U.S. Pat. Nos. 5,593,807 and 5,945,245, the disclosures of which are totally incorporated herein by reference, for example including sodium sulfonated polyester, and more specifically, a polyester such as poly(1,2-propylene-sodio 5-sulfoisophthalate), poly(neopentylene-sodio 5-sulfoisophthalate), poly(diethylene-sodio 5-sulfoisophthalate), copoly (1,2-propylene-sodio 5-sulfoisophtalate)-copoly-(1,2-propylene-terephthalate-phthalate), copoly(1,2-propylene-diethylene-sodio 5-sulfoisophthalate)-copoly-(1,2-propylene-diethylene-terephthalate-phthalate), copoly (ethylene-neopentylene-sodio 5-sulfoisophthalate)-copoly-(ethylene-neopentylene-terephthalate-phthalate), and copoly(propoxylated bisphenol A)-copoly-(propoxylated bisphenol A-sodio 5-sulfoisophthalate).

The sulfonated polyesters may in embodiments be represented by the following formula, or random copolymers thereof wherein the n and p segments are separated.

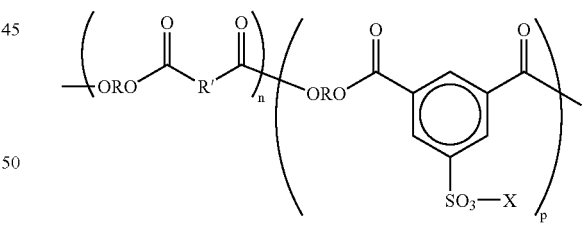

wherein R is an alkylene of, for example, from 2 to about 25 carbon atoms such as ethylene, propylene, butylene, oxyalkylene diethyleneoxide, and the like; R' is an arylene of, for example, from about 6 to about 36 carbon atoms, such as a benzylene, bisphenylene, bis(alkyloxy) bisphenolene, and the like; X represents a suitable counterion, such as an alkali metal such as sodium; and p and n represent the mole percent of the respective randomly repeating segments, such that the overall polymer contains from about 10 to about 20,000 repeating segments. The alkali sulfopolyester possesses, for example, a number average molecular weight (Mn) of from about 1,500 to about 50,000 grams per mole and a weight average molecular weight (Mw) of from about 6,000 grams per mole to about 150,000 grams per mole as measured by gel permeation chromatography and using polystyrene as standards. Preferably, n and p in the above formula are selected to represent mole percents of from about 1 to about 99, such as from about 3 or about 5 to about 95 or about 97, such that n+p=100. Preferably, in embodiments, n is about 96 mole percent and p is about 4 mole percent.

The ink composition also includes a liquid vehicle. The liquid vehicle can include one or more of water or a solvent such as a diol or a polyol or a blend of water with a water soluble cosolvent. Cosolvents that have limited solubility in water can also be used if a solubilizer third cosolvent is used to produce a homogeneous vehicle. The liquid vehicle helps to ensure that the ink composition remains in a stable, liquid state at room temperature (typically about 20° C.), but transforms to a gel state upon heating and/or upon removal of some of the water or liquid content. If desired, the liquid vehicle can be provided either as entirely water, entirely diol and/or polyol (except for any water that may be present in the latex component), or a combination of water and diol and/or polyol.

When a diol and/or a polyol is included, the selected liquid or mixture of liquids is chosen to be compatible with the other ink components, and can be either polar or non-polar in nature. Specific examples of suitable liquids include polar liquids such as glycol ethers, esters, amides, alcohols, and the like, with specific examples including butyl carbitol, tripropylene glycol monomethyl ether, 1-phenoxy-2-propanol, dibutyl phtholate, dibutyl sebacate, 1-dodecanol, and the like, as well as mixtures thereof. Other suitable examples include ethylene glycol, diethylene glycol, triethylene glycol, dimethylolpropionic acid, sucrose, polytetramethylene glycol (MW<.about.3000), polypropylene glycol (MW<.about.3000), polyester polyols (MW<.about.3000), polyethylene glycol (MW<.about.3000), pentaerythritol, triethanol amine, glycerin, 1,6-hexanediol, N-methyl-N,N-diethanol amine, trimethylol propane, N,N,N',N'-tetrakis(2-hydroxypropyl) ethethylenediamine, and the like. In some preferred embodiments, diethylene glycol is employed.

The liquid vehicle component is present in the ink in any desired or effective amount. In one embodiment, the liquid vehicle component is present in an amount of from about 5 to about 60 percent by weight of the ink; in another embodiment the liquid vehicle component is present in an amount of from about 10 to about 55 percent by weight of the ink; and in yet another embodiment the liquid vehicle component is present in an amount of from about 20 to about 50 percent by weight of the ink. However, amounts outside of these ranges can be used, as desired.

The ink compositions also contain a colorant, preferably a self-dispersible colorant. Any desired or effective colorant can be employed in the inks, including dyes, pigments, mixtures thereof, and the like, provided that the colorant can be dissolved or dispersed in the ink vehicle. The carrier compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sanodz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 26050] (BASF), Intratherm Yellow 346 from Crompton and Knowles, C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. Nos. 5,621,022 and 5,231,135, the disclosures of each of which are totally incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, and uncut Reactant Violet X-80.

Pigments are also suitable colorants for the inks. Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871 K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell); Sudan Orange G (Aldrich), Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991 K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D 1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as REGAL 330® (Cabot), Carbon Black 5250, Carbon Black 5750 (Columbia Chemical), IJX-157 (Cabot) and the like.

Other ink colors besides the subtractive primary colors can be desirable for applications such as postal marking or industrial marking and labeling, and the invention is applicable to these needs. Further, infrared (IR) or ultraviolet (UV) absorbing dyes can also be incorporated into the inks for use in applications such as "invisible" coding or marking of products. Examples of such infrared and ultraviolet absorbing dyes are disclosed in, for example, U.S. Pat. Nos. 5,378,574, 5,146,087, 5,145,518, 5,543,177, 5,225,900, 5,301,044, 5,286,286, 5,275,647, 5,208,630, 5,202,265, 5,271,764, 5,256,193, 5,385,803, and 5,554,480, the disclosures of each of which are totally incorporated herein by reference.

The colorant is present in the ink in any desired or effective amount to obtain the desired color or hue. Typically, the colorant is present in the ink in an amount of least about 0.1 percent by weight of the ink, preferably at least about 0.2 percent by weight of the ink, and more preferably at least about 0.5 percent by weight of the ink, and typically no more than about 50 percent by weight of the ink, preferably no more than about 20 percent by weight of the ink, and more preferably no more than about 10 percent by weight of the ink. However, the amount can be outside of these ranges depending on specific printing needs.

The ink compositions preferably have a final solids content that is greater than about 10% by weight. Advantageously, the ink compositions can have a solids content of greater than about 15% by weight, and even more preferably greater than about 20% by weight. The ink compositions also preferably have a final water content that is less than about 80% by weight. Advantageously, the ink compositions can have a water content of less than about 70% by weight, and even more preferably less than about 60% by weight.

In embodiments, the proportion of solid additives in the ink composition is selected to provide an ink composition that provides a phase transition from a liquid state to a gel state at an elevated temperature above ambient temperature. Thus, for example, the ink composition exhibits a phase transition from a liquid state to a gel state at a temperature of not less than about 30° C., and preferably not less than about 40° C. or not less than about 50° C.

The ink compositions can be prepared by any desired or suitable method. For example, the ink ingredients can be mixed together, followed by heating, to a temperature in one embodiment of at least about 50° C., and in one embodiment of no more than about 100° C., although the temperature can be outside of these ranges, and stirring until a homogeneous ink composition is obtained, followed by cooling the ink to ambient temperature (typically from about 20 to about 25° C.).

In preferred embodiments, the ink composition components with the exception of the latex are mixed together, followed by addition of the latex with mixing to achieve a final ink composition. Thus, for example, the ink composition can be prepared by first mixing a colorant, a polyol and/or a diol, a dispersant such as a sulfonated polyester, and a liquid vehicle such as water, followed by adding in the latex with stirring. In embodiments, the latex is added after the remaining ink components are mixed together, because some latexes are not stable at the higher temperatures needed to disperse the ink components such as the sulfonated polyester. However, where a particular latex exhibits high temperature stability, the ink components can be combined in a different order, such as by mixing all of the components together in a single step.

The ink compositions thus formed are in a stable, liquid state at room temperature (typically about 20° C.), but transform to a gel state upon heating and/or upon removal of some of the water or liquid content. For example, in embodiments, the ink compositions have a viscosity at 60° C. in the range of about 2 to about 30 mPa·s and preferably in the range of about 3 to about 15 mPa·s, while the viscosity at room temperature is from about 1.5 to about 4 mPa·s higher, typically about 2 mPa·s higher.

The ink compositions described above can be advantageously used in a printing process, particularly a piezoelectric printing process. The printing processes generally comprise incorporating the above ink composition into an ink jet printing apparatus, heating the ink as required, and causing droplets of the heated ink to be ejected in an imagewise pattern onto a recording substrate. In one specific embodiment, the printing apparatus employs a piezoelectric printing process wherein droplets of the ink are caused to be ejected in imagewise pattern by oscillations of piezoelectric vibrating elements. The above-described inks can also be employed in other ink jet printing processes, such as acoustic ink jet printing, thermal ink jet printing, continuous stream or deflection ink jet printing, and the like. The ink compositions can also be used in printing processes other than ink jet printing processes, including thermal transfer printing processes and the like.

The above ink compositions can be employed in apparatus for direct printing ink jet processes, wherein when droplets of the heated ink are ejected in an imagewise pattern onto a recording substrate, the recording substrate is a final recording substrate. The ink compositions can also be employed in indirect (offset) printing ink jet applications, wherein when droplets of the ink are ejected in an imagewise pattern onto a recording substrate, the recording substrate is an intermediate transfer member and the ink in the imagewise pattern is subsequently transferred from the intermediate transfer member to a final recording substrate. Yet another embodiment is directed to a process that comprises incorporating the above-described ink composition into an ink jet printing apparatus, heating the ink, causing droplets of the ink to be ejected in an imagewise pattern onto an intermediate transfer member, and transferring the ink in the imagewise pattern from the intermediate transfer member to a final recording substrate. Offset or indirect printing processes are also disclosed in, for example, U.S. Pat. Nos. 5,389,958, 5,099,256, and 4,538,156, the disclosures of each of which are totally incorporated herein by reference.

In one embodiment, subsequent to placement of the ink image onto the final substrate, either by a direct printing process or by an indirect printing process, the image thus formed is subjected to fusing by applying to the image a fusing member at a temperature at which the ink is in the gel state, i.e., at a temperature between the gel point and the melting point of the ink. This embodiment is particularly suitable when the final recording substrate is porous, such as paper or the like, since it enables control of the degree of penetration of the ink into the final substrate and can help to reduce showthrough of the ink image on the opposite surface of the final recording substrate. In a specific embodiment, the printing process is a direct printing process, wherein the droplets of the ink are ejected directly from the printing apparatus onto the final substrate, followed by fusing the image to the final substrate at a temperature lower than the gel point of the ink but greater than the melting point of the ink. Direct printing processes are disclosed in, for example, U.S. Pat. Nos. 5,195,430, 4,745,420, 4,889,761, and 5,761,597, the disclosures of each of which are totally incorporated herein by reference.

In another embodiment, subsequent to placement of the ink image onto the final substrate, either by a direct printing process or by an indirect printing process, the image thus formed is subjected to fusing at a temperature at which the ink is in the liquid state, i.e., at a temperature above the gel point of the ink. This embodiment is particularly suitable when the final recording substrate is nonporous, such as transparency stock or the like, since fusing at a temperature above the gel point of the ink can enable the ink to flow and/or absorb properly onto the nonporous final recording substrate. In a specific embodiment, the printing process is a direct printing process, wherein the droplets of the melted ink are ejected directly from the printing apparatus onto the final substrate, followed by fusing the image to the final substrate at a temperature greater than the gel point of the ink. Direct printing processes are disclosed in, for example, U.S. Pat. Nos. 5,195,430, 4,745,420, 4,889,761, and 5,761,597, the disclosures of each of which are totally incorporated herein by reference.

Fusing can be by any desired or effective method, such a those commonly known in the art of electrophotography. One method entails application of a fusing member to the image to be fused. In a specific embodiment, the fusing member is heated. The fusing member can be of any desired or suitable configuration, such as a drum or roller, a belt or web, a flat surface or platen, or the like. The fusing member can be heated by any desired or suitable method, such as by situating heaters in or near the fusing member, or the like. Optionally, a layer of a liquid such as a fuser oil can be applied to the fuser member prior to fusing. The fusing member can be applied to the image by any desired or suitable method, such as by passing the final recording substrate through a nip formed by the fusing member and a back member, which can be of any desired or effective configuration, such as a drum or roller, a belt or web, a flat surface or platen, or the like. Fusing can be effected at any desired or effective nip pressure, in one embodiment at least about 5 pounds per square inch, in another embodiment at least about 250 pounds per square inch, and in yet another embodiment at least about 500 pounds per square inch, and in one embodiment no more than about 2,000 pounds per square inch, in another embodiment no more than about 1,000 pounds per square inch, and in yet another embodiment no more than about 850 pounds per square inch, although the pressure can be outside of these ranges.

Other methods of fusing, such as radiant fusing (wherein heat is applied without pressure), microwave irradiation, flash fusing (as described in, for example, U.S. Pat. No. 4,788,123, the disclosure of which is totally incorporated herein by reference), cold pressure fusing followed by application of heat by any desired method, or the like, can also be employed.

EXAMPLES

The invention will be illustrated in greater detail with reference to the following Examples and Comparative Examples, but the invention should not be construed as being limited thereto. In the following examples and comparative examples, all the "parts" are given by weight unless otherwise indicated.

Examples 1–3

Preparation of High Viscosity Inks

A series of high viscosity ink compositions are prepared. The ink compositions are formed by mixing carbon black (IJX-157 available from Cabot, 15% solution), Voranol 370 available from Dow Chemicals, diethylene glycol available from Aldrich, and a sulfonated polyester. The sulfonated polyester has the formula:

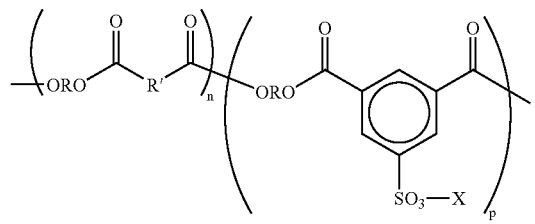

wherein R is a mixture of propylene glycol, diethylene glycol and dipropylene glycol, n is 96 mole % and p is 4 mole %.

After the components are homogeneously mixed together, a terpolymer latex (36% solution) is added while stirring with a magnetic stirrer. The terpolymer latex contains a random terpolymer of the following formula:

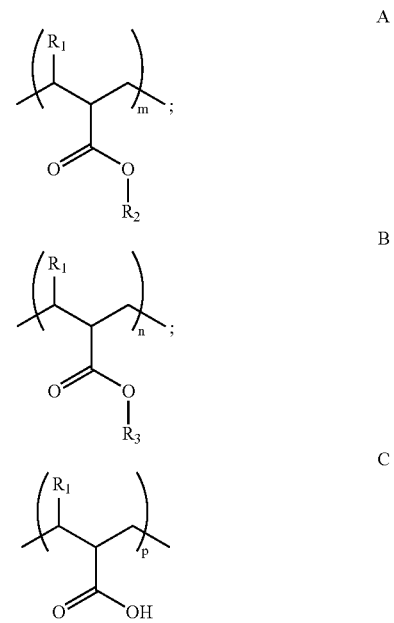

where A is a phenyl (meth)acrylate, B is an alkoxyl (meth)acrylate where the alkoxyl group is —C—C—(O—C—C)$_3$, C is a (meth)acrylate, n is from about 30 to 50 mole percent, m is from about 10 to 50 mole percent and p is from about 1 to about 5 mole percent.

The specific compositions of the ink compositions, in weight percent, are as follows:

|  | Example 1 | Example 2 | Example 3 |
| --- | --- | --- | --- |
| Carbon black | 35 | 35 | 35 |
| Voranol 370 | 9.6 | 0 | 3.8 |
| Diethylene glycol | 26.5 | 30 | 38.1 |
| Sulfonated polyester | 19.1 | 20 | 20 |
| Latex | 9.8 | 15 | 13.1 |

The ink compositions have a final solids content of about 15 weight %.

The ink compositions are stable liquids at ambient temperature, but form high viscosity gels at high temperatures (about 60° C.). The ink compositions are tested using draw down testing techniques, to obtain optical density and showthrough values. This draw down testing is conventionally used to simulate printed images. The draw down tests use a horizontal draw down board and a 2.5 draw down rod. A small volume of ink is placed on a plastic sheet above the paper; and the draw down rod is then rolled over the ink and the bare paper so that a consistent layer of ink is applied to the paper. The optical density and show through are measured using a GretagMacbeth SpectroScan. Optical density is a measure of how black the ink is on the front side of the paper, where an ideal ink has an optical density higher than 1.4. Show through is a measure of how black the ink made the backside of the paper, where an ideal ink has a showthrough less than 0.13. The showthrough, optical density and viscosity measurements for the ink compositions are shown in the following Table:

|  | Showthrough | Optical density | Viscosity (150/s, 60° C.) (mPa · s) | Viscosity (150/s, 25° C.) (mPa · s) |
|---|---|---|---|---|
| Example 1 | 0.186 | 1.09 | 4.3 | 6.3 |
| Example 2 | 0.129 | 1.38 | 4.0 | 6.0 |
| Example 3 | 0.183 | 1.09 | 3.8 | 5.8 |

Although the above data is obtained using the draw down testing, the ink compositions would be expected to show good optical density and minimum showthrough on plain paper when jetted in a conventional printer, such as a piezoelectric ink jet printer.

Examples 4–9

Preparation of Heterogeneous Gel Inks

A series of high viscosity gel ink compositions are prepared as in Examples 1–3, with different ratios of components. The sulfonated polyester and terpolymer latex used are the same as used in Examples 1–3.

The ink compositions are formed by mixing carbon black (IJX-157 available from Cabot, dry), Voranol 370 available from Dow Chemicals, water, and sulfonated polyester (30% solution). After the components are homogeneously mixed together, the terpolymer latex (36% solution) is added while stirring with a magnetic stirrer.

The specific compositions of the ink compositions, in weight percent, are as follows:

|  | Ex. 4 | Ex. 5 | Ex. 6 | Ex. 7 | Ex. 8 | Ex. 9 |
|---|---|---|---|---|---|---|
| Carbon black | 5.3 | 5.2 | 5.2 | 5.3 | 5.3 | 5.2 |
| Voranol 370 | 26.5 | 26.2 | 28.1 | 26.5 | 17.9 | 9.9 |
| Water | 12.6 | 18.2 | 24.4 | 12.6 | 21.2 | 29.8 |
| Sulfonated polyester | 18.2 | 18.0 | 17.9 | 18.2 | 18.3 | 18.1 |

The ink compositions have a final solids content of about 25 weight %.

The ink compositions are stable liquids at ambient temperature, but form high viscosity gels at high temperatures (>than about 35° C. and preferably greater than 50 degree C.). The ink compositions are tested using a draw down test, as described above, to simulate jetting using a piezoelectric ink jet printer. The resultant printed images show good optical density and minimum showthrough on plan paper. The showthrough and optical density and viscosity measurements for the ink compositions are shown in the following Table:

|  | Optical density | Showthrough |
|---|---|---|
| Example 4 | 1.74 | 0.128 |
| Example 5 | 1.51 | 0.134 |
| Example 6 | 1.36 | 0.142 |
| Example 7 | 1.74 | 0.128 |
| Example 8 | 1.29 | 0.132 |
| Example 9 | 1.23 | 0.121 |

While the invention has been described in detail and with reference to specific embodiments thereof, it will be apparent to one skilled in the art that various changes and modifications can be made therein without departing from the spirit and scope thereof.

What is claimed is:

1. An ink composition, comprising:
a colorant;
a polymer latex;
an optional dissipatable polymer;
a dispersant; and
a liquid vehicle,
wherein the polymer latex is a random terpolymer comprised of monomer units of the following formula:

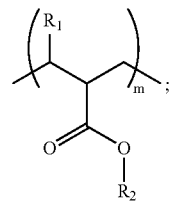

A

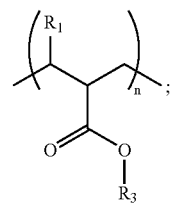

B

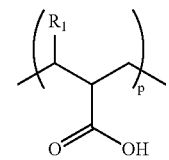

C wherein A, B and C represent monomer units, m, n and p represent mole fractions of the respective monomer unit of the random terpolymer, $R_1$ is a hydrogen or methyl group corresponding to the acrylate or methacrylate monomer, $R_2$ is a substituted or unsubstituted alkyl chain of from 1 to about 10 carbon atoms or a substituted or unsubstituted phenyl group; and $R_3$ is an alkoxyl group of one or more oxygen atoms.

2. The ink composition of claim 1, wherein the colorant is selected from dyes, pigments, and mixtures of dyes and pigments.

3. The ink composition of claim 1, wherein A, B and C are independently selected from the group consisting of (meth) acrylate, alkyl (meth)acrylate, an aryl (meth)acrylate, an alkoxyl (meth)acrylate, and (meth)acrylic acid.

4. The ink composition of claim 1, wherein A, B and C are independently selected from the group consisting of (meth) acrylate, alkyl (meth)acrylate having a substitute or unsubstituted alkyl chain of from 1 to about 10 carbon atoms, an aryl (meth)acrylate where the aryl group is a substituted or unsubstituted phenyl group, an alkoxyl (meth)acrylate where the alkoxyl group has one or more oxygen atoms, and (meth)acrylic acid.

5. The ink composition of claim 1, wherein each of n, m and p is independently from about 0.1 to about 99.9 mole percent, with the sum n+m+p totaling 100.

6. The ink composition of claim 1, wherein the terpolymer has a number average molecular weight of from about 5000 to about 50,000 and a weight average molecular weight of from about 10,000 to about 250,000 g/mole.

7. The ink composition of claim 1, wherein A is a phenyl (meth)acrylate, B is an alkoxyl (meth)acrylate where the alkoxyl group is —C—C—(O—C—C)$_3$, and C is a (meth) acrylate.

8. The ink composition of claim 1, wherein the dissipatable polymer comprises a mixture of one or more of the following:

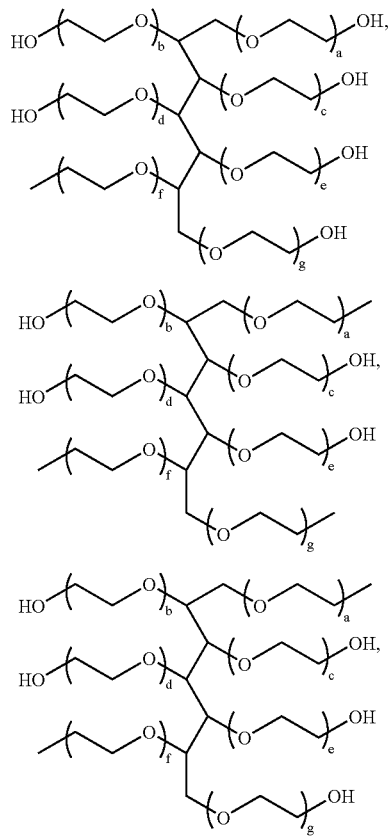

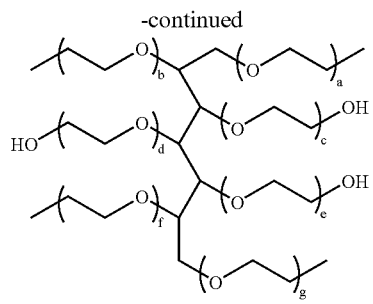

and any other mono-, di-, tri-, and tetravalent groups thereof, wherein a, b, c, d, e, f, and g are each integers representing the number of ethylene oxide repeat units.

9. The ink composition of claim 1, wherein the dispersant is a sulfonated polyester.

10. The ink composition of claim 1, wherein the dispersant is represented by the following formula:

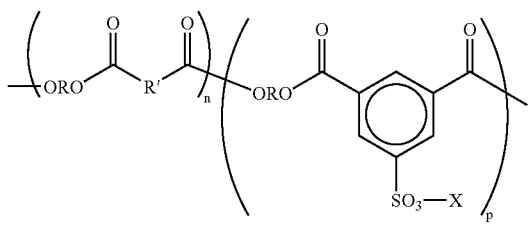

or random copolymers thereof wherein the n and p segments are separated, wherein R is an alkylene, R' is an arylene, X represents a counterion, and p and n represent mole percents of the respective randomly repeating segments.

11. The ink composition of claim 1, wherein the dispersant has a number average molecular weight of from about 1500 to about 50,000 and a weight average molecular weight of from about 6,000 to about 150,000 g/mole.

12. The ink composition of claim 1, wherein the liquid vehicle is selected from the group consisting of water, diols, polyols, and mixtures thereof.

13. The ink composition of claim 1, wherein the liquid vehicle comprises water.

14. The ink composition of claim 1, wherein the ink composition has a solids content of greater than about 10% by weight.

15. The ink composition of claim 1, wherein the ink composition has a water content of less than about 80% by weight.

16. The ink composition of claim 1, wherein the ink composition exhibits a phase transition from a liquid state to a gel state at a temperature of not less than about 30° C.

17. The ink composition of claim 1, wherein the ink composition exhibits a phase transition from a liquid state to a gel state at a temperature of not less than about 40° C.

18. The ink composition of claim 1, wherein the ink composition exhibits a phase transition from a liquid state to a gel state at a temperature of not less than about 50° C.

19. The ink composition of claim 1, wherein the ink composition is a stable liquid state at room temperature, but transforms to a gel state upon at least one of heating or removal of a part of the liquid vehicle.

20. A process for making the ink composition of claim 1, comprising:
   mixing said colorant, said optional dissipatable polymer, said dispersant, and said liquid vehicle to form a mixture; and
   blending said polymer latex into said mixture.

21. A process for forming an image, comprising:
   jetting droplets of the ink composition of claim 1 to form an image on a substrate; and
   fixing said image to said substrate.

22. The process of claim 21, wherein said jetting comprises:
   jetting said droplets of the ink composition onto a heated intermediate transfer member to form an image; and
   transferring said image from said heated intermediate transfer member to said substrate.

23. The process of claim 21, wherein said fixing comprises at least one of fusing under temperature, fusing under pressure, and fusing with a radiant fuser.

24. An ink composition, comprising:
   a colorant;
   a polymer latex;
   a optional dispersible polymer;
   a dispersant; and
   a liquid vehicle,
   wherein the dispersant is a sulfonated polyester, which is represented by the following formula:

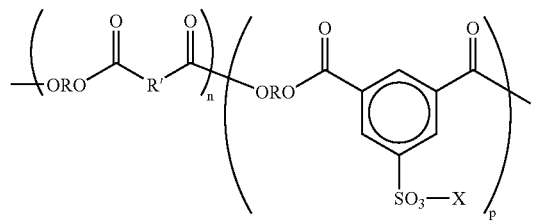

or random copolymers thereof wherein the n and p segments are separated, wherein R is an alkylene, R' is an arylene, X represents a counterion, and p and n represents mole percents of the respective randomly repeating segments.

* * * * *